United States Patent [19]

Tajima et al.

[11] 4,360,845
[45] Nov. 23, 1982

[54] CASE FOR A DISC-SHAPED RECORDING MEDIUM

[75] Inventors: Osamu Tajima, Kanagawa; Takashi Yamamura, Yokohama; Masafumi Mochizuki, Yamato; Yoichi Mita, Tokyo, all of Japan

[73] Assignee: Victor Company of Japan, Ltd., Yokohama, Japan

[21] Appl. No.: 229,303

[22] Filed: Jan. 28, 1981

[30] Foreign Application Priority Data

Feb. 1, 1980 [JP] Japan .................... 55-11278

[51] Int. Cl.³ .................... G11B 5/82; G11B 25/04
[52] U.S. Cl. .................... 360/133; 206/444; 360/97
[58] Field of Search .................... 360/133, 135, 97–99, 360/86; 206/309, 312, 313, 444

[56] References Cited

U.S. PATENT DOCUMENTS

| | | | |
|---|---|---|---|
| 4,164,782 | 8/1979 | Stewart | 360/133 |
| 4,239,108 | 12/1980 | Coleman | 206/312 |
| 4,239,238 | 12/1980 | Coleman | 206/444 |
| 4,266,784 | 5/1981 | Torrington | 360/133 |

Primary Examiner—Alfred H. Eddleman
Attorney, Agent, or Firm—Louis Bernat

[57] ABSTRACT

A case for a disc-shaped recording medium is used in a disc-shaped recording medium reproducing apparatus provided with an insertion opening through which the case is inserted, a turntable for rotating the disc-shaped recording medium, a lid plate locking member and a disc-shaped recording medium clamping member provided at the innermost part of the disc-shaped recording medium reproducing apparatus opposite to the inserting opening with respect to the turntable, and a jacket opening enlarging member provided in the vicinity of the insertion opening, capable of moving between the position in the vicinity of the insertion opening and the innermost part of the disc-shaped recording medium reproducing apparatus above the turntable. The case comprises a jacket having a space for accommodating the disc-shaped recording medium and an opening for allowing the disc-shaped recording medium to go in and out of the jacket, and a lid plate inserted through the opening of the jacket for closing the opening of the jacket. The lid plate has cutouts wherein the jacket opening enlarging member and the lid plate locking member enter. The opening of the jacket is enlarged by the jacket opening enlarging member within the cutouts of the lid plate upon insertion of the jacket inside the reproducing apparatus through the insertion opening. The lid plate is locked by the lid plate locking member within the cutouts of the lid plate upon insertion into the innermost part of the reproducing apparatus together with the jacket. The lid plate further has a ride-over part for to allowing the disc-shaped recording medium clamping member to ride over said lid plate and enter from the enlarged opening of the jacket and clamp the disc-shaped recording medium inside the jacket upon insertion of the lid plate into the innermost part of the reproducing apparatus together with the jacket. The jacket is pulled out in an empty state leaving behind the lid plate locked by the lid plate locking member and the disc-shaped recording medium clamped by the disc-shaped recording medium clamping member, when the jacket is pulled out from within the reproducing apparatus in a direction opposite to the direction of the insertion.

13 Claims, 11 Drawing Figures

CASE FOR A DISC-SHAPED RECORDING MEDIUM

BACKGROUND OF THE INVENTION

The present invention generally relates to cases for disc-shaped recording mediums, and more particularly to a case comprising a jacket for accommodating a disc-shaped recording medium and a lid plate for closing an opening of the jacket, which, by cooperation with a disc-shaped recording medium reproducing apparatus having means for enlarging the jacket opening and means for clamping the peripheral part of the disc-shaped recording medium, is capable of placing the recording medium at a reproducing and playing position within the reproducing apparatus by inserting the jacket having the recording medium incased or accommodated therein and closed by the lid plate within the reproducing apparatus, and by inserting the empty jacket once again within the reproducing apparatus, capable of accommodating the recording medium inside the jacket to allow the case to be once again taken out outside the reproducing apparatus.

Conventionally, cases accommodating a disc-shaped recording medium (hereinafter simply referred to as a disc) such as a video disc recorded with video signals, and an audio disc recorded with pulse code modulated (PCM) audio signals, have been proposed. In this type of disc cases, a disc remains at a predetermined position within a reproducing apparatus by performing an operation in which a disc case having the disc accommodated therein is inserted within the reproducing apparatus and then pulled out from the reproducing apparatus, and by inserting the empty disc case into the reproducing apparatus, the disc within the reproducing apparatus is incased inside the disc case, to be obtained outside the reproducing apparatus.

The above conventional type of a disc case comprises a rigid jacket for accommodating a disc, and a tray having a front part which is engaged by engaging means upon complete insertion of the disc case within the reproducing apparatus and an annular or ring portion fixed to the front part for encircling the outer periphery of the disc. When this disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

Thus, in the above conventional disc case, the peripheral side surface of the disc is held by the engaged annular portion of the tray and the disc remains within the reproducing apparatus upon pulling of the jacket outside the reproducing apparatus. Accordingly, a supporting mechanism which is placed with the remaining disc thereon and supports the outer peripheral edge part of the disc, is provided in the reproducing apparatus. Hence, the turntable must be constructed so as to relatively move up-and-down within the inner side of the supporting mechanism. This means that the diameter of the turntable must be smaller than the diameter of the disc, and the outer peripheral edge part of the turntable thus makes contact with and supports the disc at the signal recording surface which is to the inner side of the outer peripheral edge part of the lower disc surface. Therefore, scratches are easily made on the signal recording surface part of the disc which is supported by the turntable, and especially when starting the rotation of the turntable, suffers a disadvantage in that scratches are more easily made in this case due to a force acting in a direction so as to rub the disc. Accordingly, when the disc is used many times, fine reproduction cannot be obtained due to the above scratches formed on the signal recording surface of the disc.

Furthermore, the above tray comprises the annular portion for encircling the outer peripheral surface of the disc, and thus suffers disadvantages in that the construction of the disc case is complex, the manufacturing of the disc case is troublesome, and the disc case requires a large amount of material and cannot be manufactured at low cost.

Moreover, upon reproduction, when a reproducing transducer of the reproducing apparatus moves to the position of the signal recording surface on the disc surface, the reproducing transducer must traverse over the annular portion of the tray. This traversing movement accordingly leads to a disadvantage in that the reproducing transducer moving mechanism must be designed so that the reproducing transducer does not collide with the annular portion, and the construction of the mechanism thus becomes complex.

In addition, the conventional disc case suffered a disadvantage in that, when the disc is relatively pulled out from the jacket by the tray upon insertion and then pulling out of the jacket from within the reproducing apparatus, or when the disc is relatively inserted into the jacket by the tray upon insertion of the empty jacket and then pulling out of the jacket, the jacket rubs against the disc and scratches are easily introduced.

SUMMARY OF THE INVENTION

Accordingly, a general object of the present invention is to provide a novel and useful disc case in which the above described problems have been eliminated.

Another and more specific object of the present invention is to provide a disc case in which an opening and its adjacent parts of a jacket are constructed so that the opening can be enlarged upon loading of a disc which is incased inside the jacket, into a disc reproducing apparatus. The disc does not make any unnecessary contact with the jacket and scratches are not introduced, when the jacket is pulled out from the reproducing apparatus after placing the disc inside the reproducing apparatus, or when accommodating the disc placed inside the reproducing apparatus into the empty jacket.

Still another object of the present invention is to provide a disc case which enables clamping means of a reproducing apparatus to enter inside a jacket to clamp a disc incased inside the jacket, by riding over a lid plate which closes an opening of the jacket. Since the disc is clamped by the clamping means of the reproducing apparatus, the jacket can easily be pulled out from the reproducing apparatus after placing the disc inside the reproducing apparatus, and furthermore, because the lid plate is independent from the operation in which the disc is relatively pulled out from within the jacket, the construction of the disc case becomes quite simple, enabling the disc case to be manufactured at low cost.

Further objects and features of the present invention will be apparent from the following detailed description when read in conjunction with the accompanying drawings.

DETAILED DESCRIPTION

Figures 1, 3:
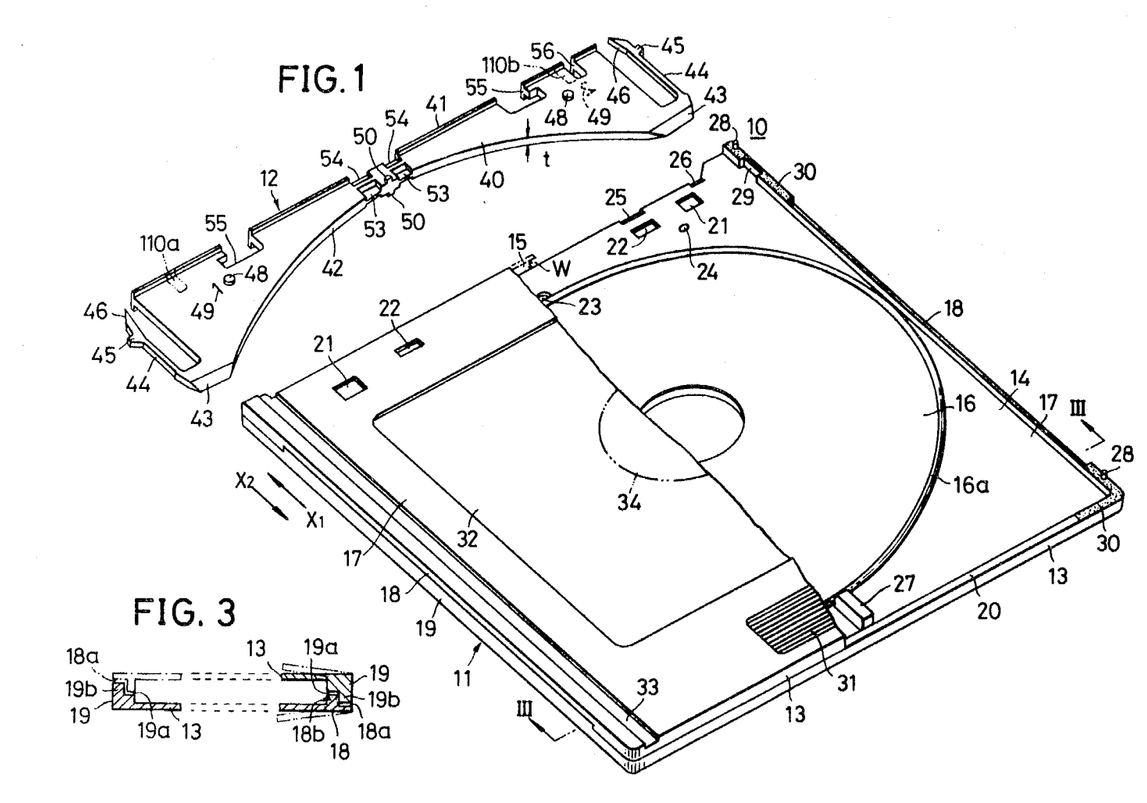
FIG. 1 is a perspective view showing a first embodiment of a disc case according to the present invention, with a part cut away and disassembled.
FIG. 3 is a cross-sectional view showing the disc case of FIG. 1 cut along the line III—III, with a part omitted.
Figures 2, 4:
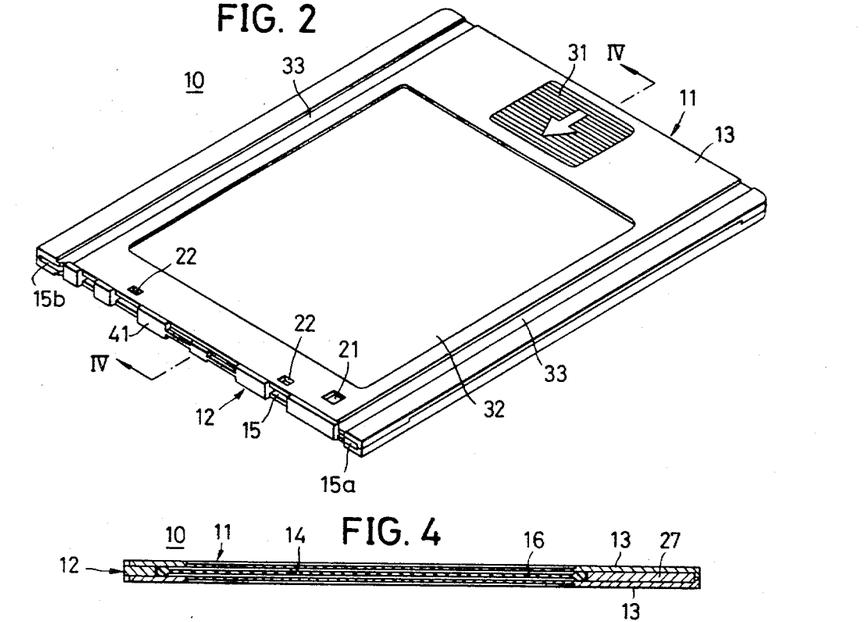
FIG. 2 is a perspective view showing a disc accommodating state of the disc case of FIG. 1.
FIG. 4 is a cross-sectional view showing the disc case of FIG. 2 cut along the line IV—IV.

In FIGS. 1 and 2, a disc case 10 comprises a jacket 11 and a lid plate 12. The jacket 11 is assembled from a pair of jacket halves 13 and 13, and comprises a flat cavity on space 14 therein. This space 14 is open at an opening 15 at the front side of the jacket 11 and is closed on the other three sides, and accommodates a disc 16. The thickness of the space 14 is slightly larger than that of the disc 16. The jacket halves 13 are, for example, made of styrol resin molded from the same mold die, and has a preferable flexibility so as to allow the enlarging of the opening 15 as will be described later on, and also has a suitable hardness to protect the disc 16 accommodated therein.

Each of the jacket halves 13 comprises a flat plate part 17 and ribs 18, 19, and 20 which are unitarily formed with the flat plate part 17 and are continuous in the three sides. A display window 21, a pair of engaging windows 22 and 22, a depression 23, and a pair of depressions 24 and 24 are provided on the flat plate part 17. Further, a hole can be provided instead of the depression 23. In addition, depressions can be used instead of the engaging windows 22. Sloping surfaces 25 and 26 are formed at the open edge portion of the flat plate part 17 of the jacket halves 13, and a projection 27 is formed at the innermost portion of the flat plate part 17.

The jacket halves 13 are assembled up-and-down, and step parts 18a and 19a are respectively formed on the ribs 18 and 19 so as to form side walls which enclose the space 14, as shown in FIG. 3. Moreover, a stud 28 for determining the position is formed on the rib 18, and a depression (not shown) which engages to and receives the stud 28 is formed on the rib 19. A depression 29 is formed at a predetermined position near the front inner side surface of each of the ribs 18 and 19.

The pair of jacket halves 13 and 13 are assembled as the jacket 11 by inserting the stud 28 into the opposing depression to match the stud 28 and the depression, and adhering or soldering corner parts 30 of the ribs 18, 19, and 20. Upon the above assembling of the jacket halves 13, the step parts 18a and 19a of the ribs 18 and 19 are respectively matched with projections 19b and 18b, to form side walls on three sides leaving the opening 15. Accordingly, exterior dust particles are prevented from entering the space 14 through the side walls, since the step parts 18a and 19a are respectively matched with the projections 19b and 18b.

Furthermore, a gripping part 31 provided with an antiskip design so that slipping does not occur upon gripping, are respectively formed at the rear central portion of the jacket halves 13. Label affixing parts 32 are provided at the outer surfaces of the jackets halves 13. In addition, grooves 33 are provided at both sides of the jacket halves 13, and these parts of the jacket halves are thinner than the rest of the jacket half parts. The parts other than the parts having the grooves 33 in the jacket halves 13 comprise sufficient strength to protect the disc 16 accommodated therein.

As will be described later, when enlarging the opening 15 of the jacket halves 13, the adjacent parts of the opening 15 can be curved because of their flexibility, however, curved distortion is even more facilitated by the provision of the grooves 33 on both sides of the jacket halves 13. Moreover, since the ribs 18 and 19 are not adhered except for the corner parts 30, the adjacent parts of the side wall parts can be freely distorted upon enlarging of the opening 15 as shown by the two-dot chain line in FIG. 3, and hence, enlarging of the opening 15 can easily be performed.

In addition, a transparent part 34 may be provided at the center part of each of the label affixing part 32 instead of providing the display window 21, so that the side of the disc 16 can be seen through this transparent part 34. Moreover, the jacket 11 may be made of transparent or semi-transparent materials instead of non-transparent material, so that the whole disc 16 can be seen through the jacket 11.

As clearly shown in FIGS. 1, 6A, 6B, and 6C, the lid plate 12 comprises a plate-shaped main lid body 40 which is inserted into the front portion of the space 14 through the opening 15 of the jacket 11 and closes the opening 15, and a rim portion 41 formed unitarily at the front edge of the main lid body 40, which is fixed to the front edge of the jacket 11 and does not enter within the opening 15. The lid plate 12 is, for example, made of acrylonitrile butadiene styrene (ABS) resin. The thickness t of the main lid body 40 is set at a value substantially equal to the width W of the opening 15. An arcuate part 42 having a radius of curvature larger than the radius of the disc 16, is formed at the rear end part of the main lid body 40, and wedge-shaped tapered parts 43 are formed on both sides of the main lid body 40 at the two end parts of the arcuate part 42. Sloping surfaces 47 are formed at the outer sides of the tapered parts 43. A pair of engaging arms 44 and 44 are formed on both sides of the main lid body 40. A projection 45 which engages with the depression 29 of the jacket 11 is provided at the outer side on each of the engaging arm 44, and a sloping surface 46 is formed at the tip end on each of the engaging arm 44.

The base portions of the engaging arms 44 are unitarily formed on the rear end of the main lid body 40 and extend in the forward direction, while the free ends of the engaging arms 44 can undergo resilient distortion in the direction of the arrow A. The projection 45 has a slant surface 45a and a vertical surface 45b. When the lid plate 12 enters into the jacket 11 from the opening 15, the slant surface 45a of the projection 45 makes contact with the front end side wall of the jacket 11, and thus, the engaging arm 44 is distorted inward. Upon insertion of the lid plate 12 into a predetermined position within the jacket 11, the projection 44 engages into the depression 29 in the side wall of the jacket 11, due to the flexibility of the engaging arm 44. Accordingly, the vertical surface 45b becomes fixed at the inner surface of the depression 29, and the lid plate 12 is thus prevented from slipping out from the jacket 11. Moreover, the lid plate 12 is of a simple construction as described above, only comprising the rim portion 41 and the main lid body 40, and therefore, the lid plate 12 can easily be manufactured at low cost, only requiring a small amount of material.

A stud 48 which engages with the depression 24 of the jacket 11, is respectively formed on the upper and lower surfaces of the main lid body 40. Furthermore, a display 49 which displays a "1" or a "2" (or, "A" or "B") to indicate the side of the disc 16, is respectively provided at a position corresponding to the position of the display window 21, on the upper and lower surfaces of the main lid body 40. The depression 24 and the stud 48 can be omitted.

A projection 50 which engages to the depression 23 of the jacket 11, is respectively provided on the upper and lower surfaces at the center of the main lid body 40. Clamping finger ride-over parts 54 and 54 each having sloping surfaces 51 and 52 and a thin part 53, are respectively formed at the upper and lower surfaces of the main lid body 40 on both sides of the projection 50, where it is narrow because of the shape of the arcuate part 42, so that a clamping finger of the reproducing apparatus, which will be described later on, can easily ride over the clamping finger ride-over parts 44. The thickness of the thin part 53 is smaller than that of a groove guard 16a at the outer peripheral edge part of the disc 16.

A pair of L-shaped cutouts 55 and 55 are formed at the front end of the main lid body 40 through the rim portion 41. As will be described later, a lid plate locking finger and jacket opening enlarging finger of the reproducing apparatus are inserted into the cutouts 55. Further, a cutout 56 wherein a disc surface discriminating switch is inserted, is formed at the outer side of one of the cutouts 55, extending from the rim portion 41 into the main lid body 40.

A state in which the disc 16 is accommodated within the disc case 10 will now be described. The disc 16 is accommodated within the space 14 of the jacket 11 as shown in FIGS. 1 and 4. The lid plate 12 is inserted into the front portion of the space 14 from the opening 15 of the jacket 11, and closes the opening 15. The projections 45 of the engaging arms 44 of the lid plate 12, the studs 48 of the main lid body 40, and the projections 50 respectively engage with the depressions 29, 24, and 23 of the jacket 11, to prevent the lid plate 12 from slipping out from the jacket 11. Since the lid plate fixing mechanism is constructed as described above, the slipping of the lid plate 12 outside the jacket 11 is positively prevented even when one of the engaging arms 44 is damaged. The lid plate 12 is inserted within the jacket 11 until the rim portion 41 becomes fixed to the front end of the jacket 11. The display 49 provided on the main lid body 40 is displayed through the display window 21 of the jacket 11. Moreover, the lid plate 12 and the disc 16 are separate bodies, however, their respective surface sides always have the same relationship, and the relationship between the surface side of the disc 16 and the display 49 of the lid plate 12 is thus constant.

The disc 16 is fixed at four places, that is, at the projection 27 of the jacket 11, left and right side walls (ribs 18 and 19) of the jacket 11, and center part of the arcuate part 42 of the lid plate 12, and accommodated within the space 14 without introducing unwanted gaps between the fixing part and the disc 16.

Furthermore, when the disc case 10 is severely swung around with the lid plate 12 positioned below, for example, the lid plate 12 receives a force towards the exterior of the jacket 11 at the central part of the lid plate 12 due to the centrifugal force acting on the disc 16, however, the lid plate 12 is prevented from curving since the projections 50 are engaged with the depressions 23. In addition, even when the central part of the lid plate 12 does curve outwards, the pair of engaging arms 44 are distorted in the outward direction in response to this curving of the lid plate 12, that is, the projections 45 are distorted in respective directions so as to further intrude into the depressions 29. Accordingly, in any case, the slipping out of the lid plate 12 outside the jacket 11 is positively prevented. Moreover, the above projections 50 are positioned at positions along or very near the arcuate part 42. Hence, when the opening 15 of the jacket 11 is distorted in a direction so as to slightly enlarge the opening 15 due to heat and the like, for example, and slight gaps are introduced between the main lid body 40 of the lid plate 12 and the flat plate parts 17 of the jacket halves 13, the projections 50 fix the disc 16 to prevent the disc 16 from entering inside these gaps.

The cooperation of the disc case 10 of the above construction with the reproducing apparatus will now be described in conjunction with FIGS. 7 through 9.

Figure 7:
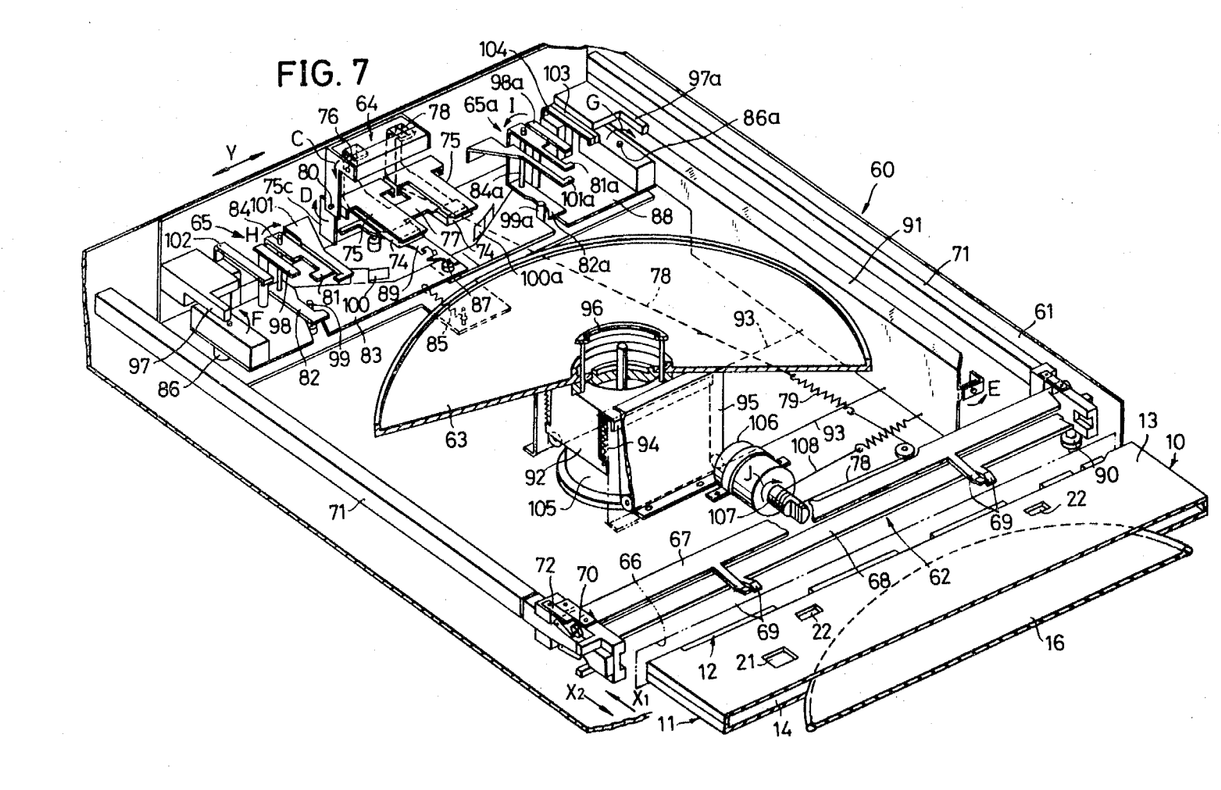
FIG. 7 is a perspective view showing an example of a disc reproducing apparatus, with a part cut away.

In FIG. 7, a disc reproducing apparatus 60 comprises a chassis case 61 substantially having a jacket opening enlarging mechanism 62, a turntable 63 which is placed with the disc 16 thereon to rotate the disc 16, a mechanism 64 for clamping the disc 16, mechanisms 65 and 65a for holding the lid plate 12, and the like.

The chassis case 61 has an inserting opening 66 into which the disc case 10 is inserted. The jacket opening enlarging mechanism 62 comprises upper and lower beams 67 and 68 existing along the inserting opening 66 in the direction of the arrow Y. A pair of opening enlarging fingers 69 which enlarge the jacket opening 15, are respectively formed on each of the beams 67 and 68 in a direction projecting towards the inserting opening 66. The beams 67 and 68 can be moved through rollers 70 along guides 71 in the directions of arrows X1 and X2. When the disc case 10 is not inserted within the reproducing apparatus 60, the beams 67 and 68 are in positions extending toward the inserting opening 66, and the respective tip ends of the two pairs of opening enlarging fingers 69 are evenly inclined towards each other due to the action of leaf springs 72.

Figure 5:
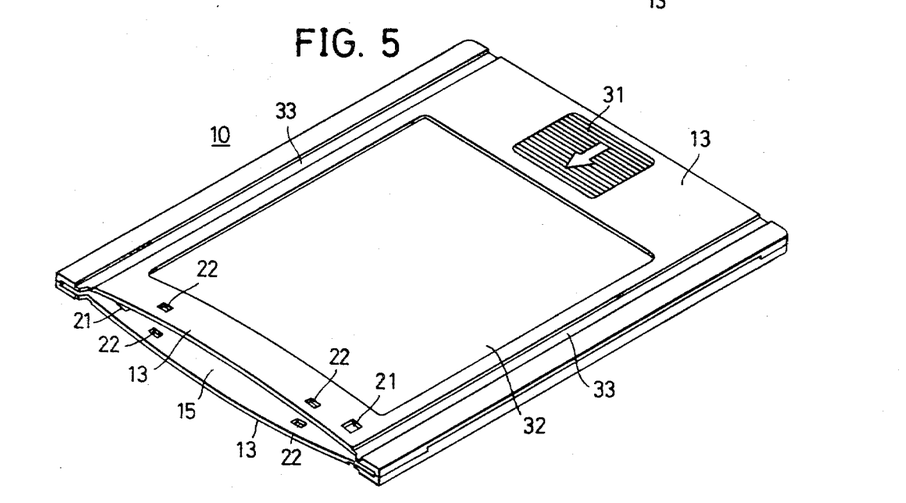
FIG. 5 is a perspective view showing a state in which an opening of a jacket in the disc case of FIGS. 1 and 2 is enlarged.

Upon reproduction of the disc 16, the disc case 10 is inserted through the inserting opening 66 of the reproducing apparatus 60, by holding the disc case 10 at the gripping part 31, and inserting the disc case 10 with the side of the lid plate 12 into the direction of the arrow X1. Accompanied by the insertion of the disc case 10 in the direction of the arrow X1, the opening enlarging fingers 69 relatively enter inside the cutouts 55 of the lid plate 12, and smoothly guided within the opening 15 of the jacket 11 by the sloping surfaces 25, to make contact with the inner parts of the cutouts 55. Furthermore, as the disc case 10 is inserted within the reproducing apparatus 60 in the direction of the arrow X1, the opening enlarging fingers 69 are pushed by the inner parts of the cutouts 55, and thus, the beams 67 and 68 also move in the direction of the arrow X1. Accompanied by this movement of the beams 67 and 68, the roller 70 rides onto a tapered part 73 of the guide 71 of FIG. 9, and hence, the beams 67 and 68 rotate so as to become horizontal, and the respective opening enlarging fingers 69 of the beams 67 and 68 rotate in directions so as to mutually separate from each other. The tip ends of the opening enlarging fingers 69 engage with the engaging windows 22 of the jacket 11, and enlarge the front part of the upper and lower jacket halves 13 upwards and downwards, to enlarge the opening 15, as shown in FIG. 5 (the opening enlarging fingers 69 are not shown in FIG. 5). In addition, since the jacket halves 13 are constructed to easily enlarge the opening 15 as described above, the enlarging operation on the opening 15 can be smoothly performed by a disc case inserting operation with use of a relatively small force.

It is assumed that the disc case 10 is inserted into the inserting opening 66 and the opening 15 is enlarged by the jacket opening enlarging mechanism 62 as described above, and the disc case 10 is then pulled out from within the reproducing apparatus 60 before the disc case 10 is completely inserted into the predetermined position inside the reproducing apparatus 60, to suspend the reproduction of the disc 16. In this case, the projection 45 on the engaging arm 44 of the lid plate 12 is still engaged to the depression 29 in the jacket 11, and hence, when the disc case 10 separates due to the jacket opening enlarging mechanism 62, the lid plate 12 is in its original position with respect to the jacket 11. Accordingly, the disc case 10 returns to its original state when the opening 15 is released from the jacket opening enlarging mechanism 62, preventing the lid plate 12 from accidentally being left inside the reproducing apparatus 60.

The disc clamping mechanism 64 is provided at the inner part of the chassis case 61 on the opposite side of the inserting opening 66, and comprises two paris of clamping fingers 74 and 75. The pair of lower clamping fingers 74 are formed at the tip end of a lever 77 axially supported on a pin 76. A wire 78 is linked to the lever 77, and the lever 77 receives a rotational force in the direction of arrow C in FIG. 9 since a force due to the force of a spring 79 is acting in the direction of arrow B. Accordingly, the clamping finger 74 receives a force urging rotation in the upward direction. The pair of upper clamping fingers 75 are respectively axially supported by a pin 80, and make contact with the lower clamping fingers 74 by rotating in the downward direction by their own weight. Furthermore, as will be described later on, upon loading of the disc 16, a vertically extending part 75c is pushed by leaf springs 100 and 100a and receives a rotational force in the direction of arrow D, and thus the upper clamping fingers 75 receive a rotational force in the downward direction.

The lid plate engaging and locking mechanisms 65 and 65a are symmetrically provided on both the left and right hand sides of the clamping mechanism 64. Since the mechanism 65a is symmetrical to the mechanism 65 and has the same construction as the mechanism 65, only the construction of the mechanism 65 will be described, and parts of the mechanism 65a corresponding to those of the mechanism 65 will be designated by the like reference numerals with a subscript "a", and their description will be omitted.

In the above engaging and locking mechanism 65, a locking finger 81 and a guiding finger 82 are axially supported by a shaft 84 embodedly formed on a lever 83. The lever 83 is urged in the clockwise direction with respect to a shaft 86 by a rotational force provided by a spring 85, and is linked to another lever 88 axially supported by a shaft 86a by a pin 87 and a longitudinal opening which engages to this pin 87. Accordingly, these two linked levers 83 and 88 rotate in mutually opposite directions. A latch 89 engages to and locks the pin 87 when the pin 87 first moves in the direction of the arrow X1, and releases the engagement when the pin 87 next moves again in the direction of the arrow X1.

When the jacket opening enlarging mechanism 62 moves in the direction of the arrow X1 due to the inserting movement of the disc case 10 through the inserting opening 66, a roller 90 pushes and rotates a rotatable plate 91 in the direction of arrow E. A push-up plate 92 is pulled by a wire 93 due to the rotating movement of the rotatable plate 91, and is pulled down against the forces of springs 94. The push-up plate 92 is suspended and supported by the springs 94 with respect to support plates 95. By the downward movement of the push-up plate 92, a push-up member 96 moves downwards to recede from the moving passage of the disc case 10.

When the disc case 10 is inserted into the inner part of the reproducing apparatus 60 together with the jacket opening enlarging mechanism 62, engagement releasing fingers 97 and 97a which are fixedly provided on both the left and right sides at the inner part of the reproducing apparatus 60 relatively enter into openings 15a and 15b (FIG. 6B) provided on both sides at the front surface of the disc case 10, and push the sloping surfaces 46 of the engaging arms 44. Accordingly, the engaging arms 44 are bent inwards, and the projections 45 slip out of the depressions 29, to release the engagement of the lid plate 12 with respect to the jacket 11.

Accompanied by the above described movements, the locking fingers 81 and 81a pass through between the beams 67 and 68 and the upper and lower jacket opening enlarging fingers 69, to relatively enter inside the cutouts 55. Moreover, contact parts 98 and 98a respectively fixed on the levers 83 and 88, are pushed by the rim portion 41, and thus, the levers 83 and 88 are respectively rotated in the directions of arrows F and G. Since the guide pin 82 makes contact with a pin 99 vertically embedded in the chassis, accompanied by the rotation of the lever 83, the guiding finger 82 and the locking finger 81 are respectively rotated in the direction of arrow H along the guiding surface of the guiding finger 82. Similarly, the locking finger 81a is also rotated in the direction of arrow I. The locking fingers 81 and 81a enter inside the bent part of the L-shaped cutouts 55 due to their respective rotation in the directions of the arrows H and I, and lock the lid plate 12. Moreover, the levers 83 and 88 are held in their rotating positions due to the locking of the pin 87 into the latch 89.

Figure 8:
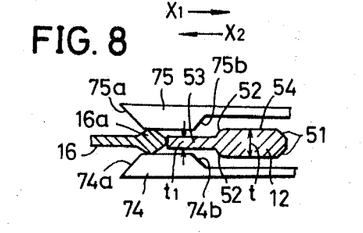
FIG. 8 is a partial side view of a clamping mechanism showing a state in which the disc is clamped.
Figure 9:
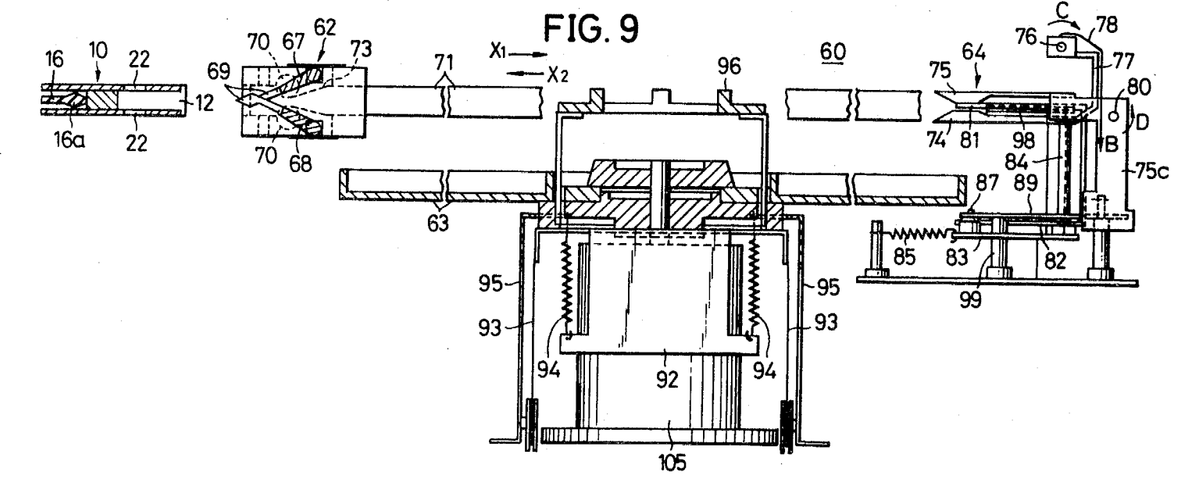
FIG. 9 is a side view showing the reproducing apparatus of FIG. 7, with some parts omitted.

Furthermore, upon insertion of the disc case 10 into the innermost part of the reproducing apparatus 60, as shown in FIG. 8, the ride-over parts 54 push and spread the clamping fingers 74 and 75 and enter between these clamping fingers 74 and 75. Sloping surfaces 74a, 74b, 75a, and 75b are respectively formed at the tip ends of the clamping fingers 74 and 75, and the above entering of the ride-over parts 54 between the clamping fingers 74 and 75 is smoothly performed by the guide given by the sloping surfaces 75a and 75b. After the ride-over parts 54 of the lid plate 12 enter between the clamping fingers 74 and 75, the clamping fingers 74 and 75 clamp the groove guard formed at the outer periphery of the disc 16. Then, since the leaf springs 100 and 100a fixed on the rising parts provided at parts of the levers 83 and 88, push the vertically extending part 75c which extends downwards, the clamping fingers 75 are thus urged in the direction of the arrow D and positively clamp the groove guard 16a.

Accordingly, during the insertion of the disc case 10 into the predetermined position at the innermost part of the reproducing apparatus 60, the opening 15 of the jacket 11 has been enlarged by the jacket opening enlarging mechanism 62, and the lid plate 12 is released of its engagement with respect to the jacket 11 and locked by the locking fingers 81 and 81a. Here, the lid plate 12 is locked by the pair of mutually separated locking fingers 81 and 81a, and also supported and held stable on relatively inserted supporting arms 101 and 101a at the rear side of the lid plate 12 within the jacket 11. The groove guard 16a of the disc 16 is positively clamped by the two paris of clamping fingers 74 and 75, and therefore, the disc 16 does not move or incline unnecessarily upon pulling out of the jacket which will be described later on.

Next, the jacket 11 is pulled out in the direction of arrow X2. Since the lid plate 11 and the disc 16 are respectively locked and clamped as described above, only the jacket 11 is moved in the direction of the arrow X2, leaving behind the lid plate 12 and the disc 16. Accompanied by this pulling out of the jacket 11, the lid plate 12 and the disc 16 are relatively pulled out from within the jacket 11. Because the opening 15 of the jacket 11 is in an enlarged state then, there is no possibility of the disc 16 being scratched by sliding against the inner surfaces of the jacket 11.

Accompanied by the movement of the jacket 11 in the direction of the arrow X2, the jacket opening enlarging mechanism 62 also moves together with the jacket in the direction of the arrow X2, since the jacket opening enlarging fingers 69 engages with the engaging windows 22 of the jacket 11. When the jacket 11 is pulled out to the vicinity of the inserting opening 66, the rotating plate 91 rotationally returns and the push-up body 96 moves up to support the center part of the disc 16. Furthermore, when the jacket 11 is pulled out, the disc 16 completely separates from the jacket 11, the jacket opening enlarging mechanism 62 returns to its original position, and the jacket opening enlarging fingers 69 rotate in directions so as to mutually close upon each other and separate from the engaging windows 22. The jacket 11 returns to its original state due to its flexibility, and the enlarged opening 15 also returns to its original state, and the jacket 11 is completely pulled out from the reproducing apparatus 60. In this state, the disc 16 is supported horizontally at a position above the turntable 63, by the clamping fingers 74 and 75 and the push-up member 96.

When a play button (not shown) is then pushed, a motor 106 begins to rotate, and a take-up shaft 107 rotates in the direction of arrow J, and hence wires 78 and 108 are thus pulled out from the take-up shaft 107. Accordingly, the rotatable plate 91 rotates in the direction of the arrow E, and the clamping fingers 74 rotate in a direction opposite to the direction of the arrow C, to release the clamping with respect to the disc 16 and move the push-up member 96 downwards. Hence, the disc 16 moves down and is placed on the turntable 63, to be rotated together with the turntable 63 which is rotated by a motor 105. The push-up plate 92 is then separated from the push-up member 96. A reproducing pick-up apparatus (not shown) is moved above the disc 16 by a transfer apparatus to reproduce recorded signals from the disc 16.

Next, an operation in which the disc 16 is recovered from within the reproducing apparatus 60, will now be described.

Figure 6A:
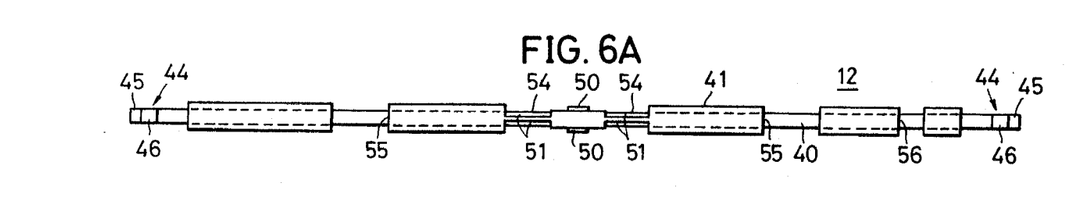
FIGS. 6A, 6B, and 6C are front view, plan view, and side view respectively showing a lid plate of the disc case of FIG. 1.
Figures 6B, 6C:
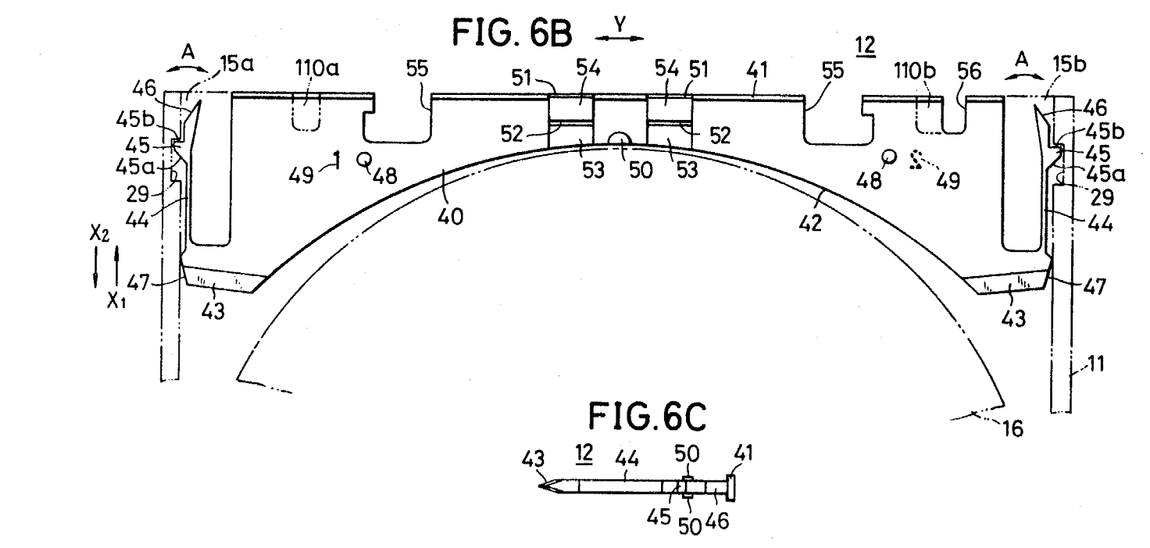

Upon completion of the reproducing operation, the motor 106 rotates in a direction opposite to the direction of the arrow J after the motor 105 and the turntable 63 stop rotating, and the take-up shaft 107 takes up the wires 78 and 108. Accordingly, the rotatable plate 91 rotates in a direction so as to loosen the wire 93, and the push-up member 96 thus moves up to push the disc 16 up. The arcuate part 42 of the lid plate 12 has a radius of curvature larger than the radius of the disc 16, and as shown in FIG. 6B, the arcuate part 42 of the lid plate 12 is separated from the disc 16 at both the left and right sides. Accordingly, even when the lid plate 12 is locked in an inclined state with respect to the direction of arrow Y, the disc 16 does not make contact with the lid plate 12 upon the upward movement of the disc 16. Furthermore, the clamping fingers 74 rotate in the direction of the arrow C, to clamp the disc 16 between the clamping fingers 75. The take-up part of the take-up shaft 107 for taking up the wire 78 has a semi-circular cross section, and the take-up shaft 107 is stopped at a position where it hardly takes up the wire 78 upon starting of the rotation. On the other hand, the wire 108 is taken up by the part of the take-up shaft 107 having circular cross section. Hence, the wire 108 is taken up by the take-up shaft 107 from the start of the rotation of the take-up shaft 107, and the wire 78 is taken up after a slight time delay. Therefore, the clamping operation by the clamping fingers 74 is performed after the disc 16 is pushed upwards by the push-up member 96, and the disc 16 is then positively clamped.

Upon recovering of the disc 16, the empty jacket 11 is inserted with its front end first into the reproducing apparatus 60 through the inserting opening 66. The jacket opening enlarging mechanism 62 is pushed by the jacket 11 and moves again in the direction of the arrow X1, to enlarge the opening 15 of the jacket 11. Accompanied by the insertion of the jacket 11 in the direction of the arrow X1, the disc 16 is relatively inserted inside the jacket 11 through the opening 15. Since the opening 15 is in the enlarged state then, there is no possibility of the disc 16 being scratched by sliding against the inner surfaces of the jacket 11.

Accompanied by the above insertion of the jacket 11, the rotating plate 91 is rotated after inserting of the disc 16 into the jacket 11 is started, and the push-up member 96 moves down to a lower position to recede from the moving passage of the jacket 11.

When the jacket 11 is inserted into the innermost position inside the reproducing apparatus 60, the disc 16 becomes completely incased within the jacket 11, and furthermore, the locked lid plate 12 is relatively inserted within the opening 15 of the jacket 11. Upon insertion of the lid plate 12 into the jacket 11, even when the lid plate 12 is slightly inclined, the position of the lid plate 12 is corrected by the guide given by the tapered parts 43 and the sloping surfaces 47, and thus, the above insertion of the lid plate 12 inside the jacket 11 is positively performed.

Even after the lid plate 12 is completely inserted within the jacket 11, the jacket 11 is further pushed inwards together with the lid plate 12 in the direction of the arrow X1. Accordingly, the locking mechanisms 65 and 65a are also pushed, and the pin 87 is thus pushed in the direction of the arrow X1, and hence, the pin 87 separates from the latch 89. When the jacket 11 is then pulled out in the direction of the arrow X2, the levers 83 and 88 rotationally return due to the force exerted by the spring 85, and the lid plate 12 is pushed in the direction of the arrow X2 by the contact fingers 98 and 98a. Moreover, the locking fingers 81 and 81a rotate in directions so as to mutually close upon each other and slip out from the inner parts of the cutouts 55 and 55a of the lid plate 12, to release the locking engagement with respect to the lid plate 12.

When the lid plate 12 pushed by the contact fingers 98 and 98a moves a little in the direction of the arrow X2 together with the jacket 11, the sloping surfaces 46 on the engaging arms 44 of the lid plate 12 separate from the engagement releasing fingers 97 and 97a, and the engagement is released. Accordingly, the engaging arms 44 rotationally return to the original states, and the projections 45 engage to the depressions 29, the lid plate 12 becomes engaged to the jacket 11.

From then on, the lid plate 12 moves in the direction of the arrow X2 together with the jacket 11, the disc 16 is pushed by the arcuate part 42 of the lid plate 12, and the disc 16 is pulled out from between the clamping fingers 74 and 75. In addition, upon this state, the ride-over parts 54 of the lid plate 12 are guided by the sloping surfaces 52, and the sloping surfaces 74b and 75b of the clamping fingers 74 and 75, and the lid plate 12 smoothly slides out from between the clamping fingers 74 and 75. The disc 16 is then incased within the jacket 11, and is pulled in the direction of the arrow X2 together with the jacket 11 and the lid plate 12 in a state in which the disc 16 is prevented from slipping out by the lid plate 12, and thus pulled out from within the reproducing apparatus 60 incased inside the disc case 10. When the jacket 11 is pulled out from within the reproducing apparatus 60, the enlarged opening 15 of the jacket 11 returns to the original state due to the release of the engagement by the jacket opening enlarging mechanism 62, and the opening 15 becomes completely closed by the lid plate 12.

Furthermore, upon the above recovering of the disc 16, either side of the jacket 11 can be facing up when the empty jacket 11 is inserted inside the reproducing apparatus 60. Since the relationship between the sides of the disc 16 and the sides of the lid plate 12 is always the same, the display 49 provided on the lid plate 12 is displayed through the display window 21 after the disc 16 and the lid plate 12 are accommodated in the jacket 11, and whether the disc 16 is incased within the jacket 11 can be known from the above displayed side of the disc 16.

Moreover, a first side detection switch 102, a second side detection switch 103, disc type discriminating switch 104 are respectively provided at predetermined positions at the innermost part of the reproducing apparatus 60. In the above embodiment of the invention, the lid plate 12 is for a video disc, and in the state shown in FIGS. 1 and 6B, the lid plate 12 and the disc 16 have their first sides facing up. When the disc case 10 is inserted within the reproducing apparatus 60 in this state, the switches 102 and 104 are pushed by the rim portion 41 of the lid plate 12 and are turned ON. The switch 103 enters the cutout 56 of the lid plate 12 and is in the OFF state. It is detected that the disc 16 is loaded with the first side facing up by the turning ON of the switch 102, and further, it is detected that the disc 16 is a video disc by the turning ON of the switch 104.

When the disc case 10 is inserted into the reproducing apparatus 60 with the sides reversed from the above state, with the second side of the disc 16 facing up, the switch 102 is in the OFF state since the cutout 56 of the lid plate 12 is positioned at the left side in the FIGS. 1 and 6B. However, the switch 103 is pushed by the rim portion 41 of the lid plate 12 and is turned ON, to detect the second side of the disc 16.

When using a PCM audio disc as the disc 16, a lid plate additionally provided with cutouts 110a and 110b shown by two-dot chain lines of FIGS. 1 and 6B on symmetrical positions on the left and right, is used. In this case, even when the disc case 10 is inserted into the innermost part of the reproducing apparatus 60, the discriminating switch 104 enters within the cutout 110a or 110b and is in the OFF state. Accordingly, it is detected that the disc inserted is the PCM audio disc. The detection of the sides of the disc is performed in the same manner as in the case of the above described video disc.

Further, this invention is not limited to these embodiments but various variations and modifications may be made without departing from the scope of the invention.

What is claimed is:

1. A case for a disc-shaped recording medium used in a disc-shaped recording medium reproducing apparatus, said reproducing apparatus being provided with an insertion opening through which said case is inserted, a turntable for rotating said disc-shaped recording medium, a lid plate locking member and a disc-shaped recording medium clamping member provided at the innermost part of said disc-shaped recording medium reproducing apparatus opposite to said insertion opening with respect to said turntable, and a jacket opening enlarging member provided in the vicinity of said insertion opening, capable of moving between the position in the vicinity of said insertion opening and said innermost part of said disc-shaped recording medium reproducing apparatus above said turntable, said case comprising:

a jacket having a space for accommodating said disc-shaped recording medium and an opening for allowing said disc-shaped recording medium to go in and out of said jacket; and a lid plate inserted through said opening of said jacket for closing said opening of said jacket, said lid plate having cutouts wherein said jacket opening enlarging member and said lid plate locking member enter, said opening of said jacket being enlarged by said jacket opening enlarging member within said cutouts of said lid plate upon insertion of said jacket inside said reproducing apparatus through said insertion opening, said lid plate being locked by said lid plate locking member within said cutouts of said lid plate upon insertion into said innermost part of said reproducing apparatus together with said jacket, said lid plate further having a ride-over part for allowing said disc-shaped recording medium clamping member to ride over said lid plate and enter from the enlarged opening of said jacket and clamp said disc-shaped recording medium inside said jacket upon insertion of said lid plate into said innermost part of said reproducing apparatus together with said jacket, and said jacket being pulled out in an empty state leaving behind said lid plate locked by said lid plate locking member and said disc-shaped recording medium clamped by said disc-shaped recording medium clamping member, when said jacket is pulled out from within said reproducing apparatus in a direction opposite to the direction of the insertion.

2. A case as claimed in claim 1 in which said jacket further comprises a thin part on both side parts thereof to facilitate the enlarging of said opening of said jacket by said jacket opening enlarging member.

3. A case as claimed in claim 1 in which said jacket further comprises an engaging part to which the tip end of said jacket opening enlarging member engages, at the vicinity of said opening of said jacket.

4. A case as claimed in claim 1 in which said lid plate limits the plane movement of said disc-shaped recording medium towards the direction of said opening of said jacket within said jacket, and said jacket limits the planar movement of said disc-shaped recording medium in directions other than the above, when said case is in a state in which said disc-shaped recording medium is incased inside said case.

5. A case as claimed in claim 1 in which said jacket is assembled from a pair of jacket halves, where said jacket half has ribs formed at three sides thereof excluding the side on which said opening of said jacket is formed, and said pair of jacket halves are adhered and matched with each other at only the four corners.

6. A case as claimed in claim 1 in which said jacket is made of an opaque material, and is provided with a part through which the incased disc-shaped recording medium can be seen at the flat part thereof.

7. A case as claimed in claim 1 in which said lid plate has a projection at the center part thereof, and said jacket has an engaging part which is engaged with said projection of said lid plate.

8. A case as claimed in claim 1 in which said lid plate has an arcuate part having a shape so that said lid plate makes contact with said disc-shaped recording medium at the center thereof and gradually separates from said disc-shaped recording medium at both sides thereof, upon a state in which said disc-shaped recording medium is incased inside said case.

9. A case as claimed in claim 1 in which: said lid plate comprises a plate-shaped main lid body, and a rim portion which makes contact with the front end of said jacket upon a state in which said main lid body is inserted into said jacket through said opening of said jacket; said main lid body is provided with displays on the upper and lower surface thereof which correspond to the sides of said disc-shaped recording medium; and said jacket is provided with windows at positions corresponding to the positions of said displays on said main lid body inserted into the jacket.

10. A case as claimed in claim 1 in which said lid plate is provided with tapered parts at tip ends on both sides thereof where said lid plate is first relatively inserted into said jacket.

11. A case as claimed in claim 1 in which said reproducing apparatus further comprises a disc-shaped recording medium side detection switch at said innermost part thereof, and said lid plate has a cutout at a position respective of the side of the incased disc-shaped recording medium wherein said disc-shaped recording medium side detection switch enters.

12. A case as claimed in claim 1 in which said reproducing apparatus further comprises a disc-shaped recording medium type detection switch at said innermost part thereof, and said lid plate has a cutout at a position respective of the type of the incased disc-shaped recording medium wherein said disc-shaped recording medium type detection switch enters.

13. A case as claimed in claim 1 in which said disc-shaped recording medium reproducing apparatus further comprises an engagement releasing member at said innermost part thereof, said lid plate unitarily has a pair of engaging arms which can be flexibly bent at both sides thereof, where said engaging arms comprises projections at the outer sides thereof, and sloping surfaces provided at the free ends thereof which are relatively pushed by said locking finger member to bend said engaging arms inward upon insertion of said lid plate into said innermost part of said reproducing apparatus together with said jacket, and said jacket is provided with depressions at both sides thereof in the vicinity of said opening of said jacket, where said depressions are engaged to said projections on said engaging arms of said lid plate and disengaged upon bending of said engaging arms in the inward direction.

* * * * *